C. WILLE.
DRYING APPARATUS.
APPLICATION FILED JAN. 5, 1912.
1,051,359.
Patented Jan. 21, 1913.
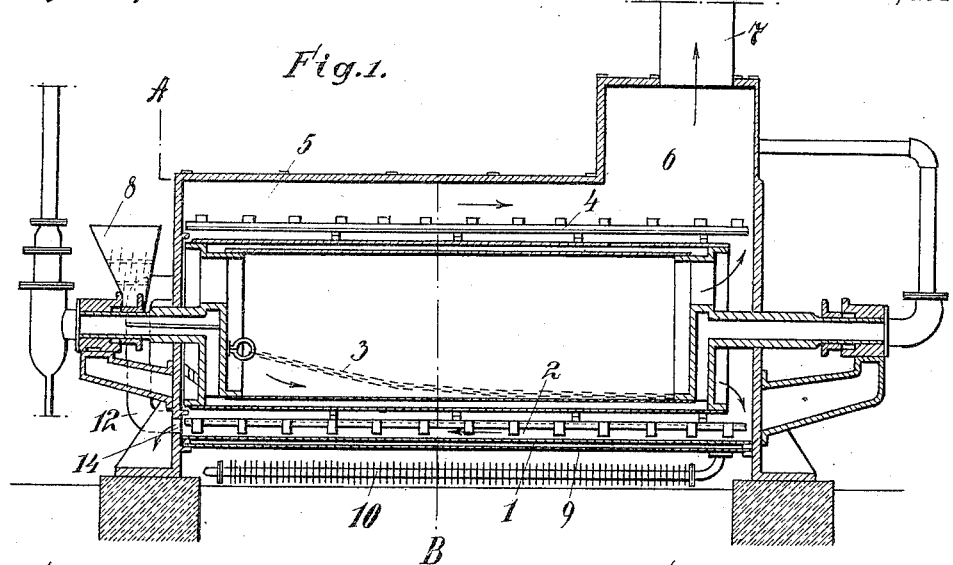
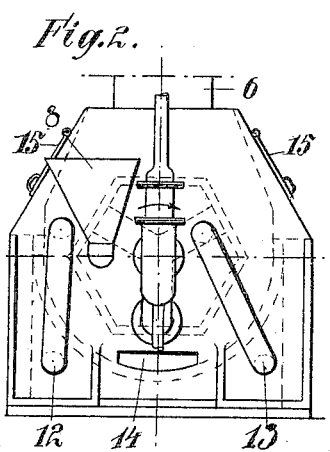
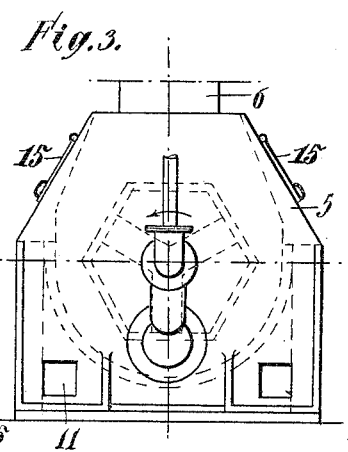
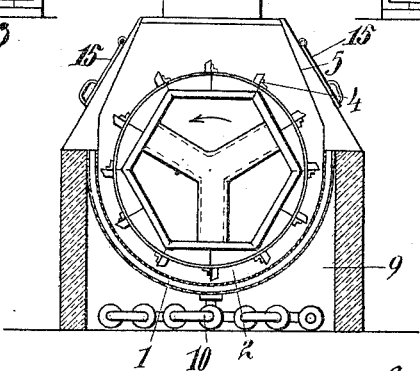
Witnesses:
Inventor:
Carl Wille,
by Frank S. Ashman
Atty.

UNITED STATES PATENT OFFICE.

CARL WILLE, OF TEMPELHOF, NEAR BERLIN, GERMANY.

DRYING APPARATUS.

1,051,359.   Specification of Letters Patent.   Patented Jan. 21, 1913.

Application filed January 5, 1912. Serial No. 669,541.

*To all whom it may concern:*

Be it known that I, CARL WILLE, a subject of the German Emperor, and residing at Tempelhof, near Berlin, Germany, have invented certain new and useful Improvements in Drying Apparatus, of which the following is a specification.

My invention relates to drying apparatus, for drying spent malt and other materials, of the type comprising a trough heated by steam, gas, or the like, containing a rotatable drum, and a primary object is to provide improved apparatus of this type. To this end, I make the drum of polygonal, *e. g.* hexagonal cross-section, and I connect both the drum and the trough in such manner with a chamber containing heaters under the drum that the air supplied to the drum and trough is preliminarily highly heated by the trough and the heaters, whereby the heating gases are used more efficiently and the drying process is accelerated.

One illustrative embodiment of my invention is represented by way of example in the accompanying drawing, wherein:—

Figure 1 is an elevation, partly in longitudinal section, Figs. 2 and 3 are front and rear end elevations, respectively, and Fig. 4 is a vertical section taken on the line A—B in Fig. 1, showing the rear portion of the drying apparatus.

Referring to the drawing, journaled in the double-walled, steam-heated trough 1 suitably carried on a foundation is the double-walled drying-drum 2 which normally contains material to be dried and can also be heated. In order that the material to be dried may be turned over better this drum has a polygonal, *e. g.* hexagonal cross-section, and its journals are hollow for the purpose of supplying the heating medium. Owing to the polygonal section of the drum 2 the otherwise customary ribs or strips are unnecessary. Extending from the one end wall of the drum to the other are a number of twisted chains 3 for turning and conveying the material to be dried. The outer shell of the drum 2 carries a frame 4 provided with blades for conveying material to be dried in the trough 1. This trough is covered over by side walls 5 in the form of a roof provided with doors 15 for the purpose of ready accessibility and control. The dust chamber 6 connected with the trough opens into a flue 7. For filling the material to be dried into the apparatus there is arranged at the front end wall of the trough a feed-hopper 8 from which the material to be dried is received by the special blades arranged on the arms or stays on the front journal of the drum and is thrown into the drum.

I provide in the foundation or bed below the trough 1 a chamber 9 in which the heaters 10 of the drain pipe connected to the trough 1 are disposed, and the fresh air entering through openings 11 at the rear passes through this chamber and is preliminarily highly heated by the trough 1 and the heaters 10. In order to conduct the preliminarily heated fresh air to the material to be dried I provide pipes 12 and 13 on the front wall of the trough, of which the former connects the chamber 9 with the trough 1 and the latter the chamber 9 with the drum 2. The opening 14 provided in the front wall of the trough 1 and able to be closed by a door or the like enables the dried material to pass out of the drying apparatus.

The above described apparatus operates as follows:—The material supplied through the feed-hopper 8 provided with stirrers falls into the front end of the drying-drum 2, is mixed therein when the drum rotates, and then falls in a substantially dry condition at the opposite end into the trough 1 and is conveyed by the frame 4 provided with blades to the front end where it falls out of the trough in its finished dry condition through the opening 14. During this operation fresh air must be supplied to the apparatus, and in the illustrative embodiment this air enters through inlets 11 into the chamber 9 and, after being highly heated by the heaters 10 of the drain pipe, is conducted through the pipes 12, 13 into the trough 1 and drum 2, respectively, whence it passes through the dust chamber 6 into the flue 7 and thence into the open.

I claim:—

1. In drying apparatus of the character described, the combination with a trough having an air-inlet and an outlet at the front end thereof, a double-walled drying-drum journaled therein opening into the rear end of the trough, and conveyer means mounted outside the drum, of a chamber having an air-inlet at the rear end thereof under the trough, heaters in said chamber, a pipe connecting the front end of the said chamber with the former air-inlet, and a pipe connecting the front end of the said chamber with the front end of the drum.

2. In drying apparatus of the character described, the combination with a trough having an air-inlet and an outlet at the front end thereof, a double-walled drying-drum journaled therein opening into the rear end of the trough, and conveyer means mounted outside the drum, of a chamber having an air-inlet at the rear end thereof under the trough, heaters in said chamber, a pipe connecting the front end of the said chamber with the former air-inlet, and a pipe connecting the front end of the said chamber with the front end of the drum, said drum being of polygonal cross-section, for the purpose specified.

3. In drying apparatus of the character described, the combination with a trough having an air-inlet and an outlet at the front end thereof, a double-walled drying-drum journaled therein opening into the rear end of the trough, and conveyer means mounted outside the drum, of a plurality of chains in the drum extending from one end of the same to the other, a chamber having an air-inlet at the rear end thereof under the trough, heaters in said chamber, a pipe connecting the front end of the said chamber with the former air-inlet, and a pipe connecting the front end of the said chamber with the front end of the drum.

In testimony whereof, I affix my signature in the presence of two witnesses.

CARL WILLE.

Witnesses:
 HENRY HASPER,
 WOLDEMAR HAUPT.